(12) United States Patent
Morozov et al.

(10) Patent No.: US 12,156,197 B2
(45) Date of Patent: Nov. 26, 2024

(54) PRECONFIGURED SHARED RESOURCES FOR UPLINK TRANSMISSION

(71) Applicant: Apple Inc., Cupertino, CA (US)

(72) Inventors: Gregory Morozov, Nizhny Novgorod (RU); Debdeep Chatterjee, San Jose, CA (US); Qiaoyang Ye, San Jose, CA (US)

(73) Assignee: APPLE INC., Cupertino, CA (US)

( * ) Notice: Subject to any disclaimer, the term of this patent is extended or adjusted under 35 U.S.C. 154(b) by 650 days.

(21) Appl. No.: 17/280,742

(22) PCT Filed: Sep. 25, 2019

(86) PCT No.: PCT/US2019/052908
§ 371 (c)(1),
(2) Date: Mar. 26, 2021

(87) PCT Pub. No.: WO2020/068947
PCT Pub. Date: Apr. 2, 2020

(65) Prior Publication Data
US 2021/0385834 A1      Dec. 9, 2021

Related U.S. Application Data

(60) Provisional application No. 62/739,057, filed on Sep. 28, 2018.

(51) Int. Cl.
*H04W 72/1268* (2023.01)
*H04L 1/1607* (2023.01)
(Continued)

(52) U.S. Cl.
CPC ....... *H04W 72/1268* (2013.01); *H04L 1/1678* (2013.01); *H04W 72/23* (2023.01); *H04W 72/51* (2023.01); *H04W 76/27* (2018.02)

(58) Field of Classification Search
CPC ... H04L 1/1671; H04L 1/1678; H04L 1/1854; H04W 4/02; H04W 4/027; H04W 4/70;
(Continued)

(56) References Cited

U.S. PATENT DOCUMENTS 9,288,028 B2 * 3/2016 Yang ............... H04L 5/0055
10,182,372 B2 * 1/2019 Kim ................ H04W 72/0446
(Continued)

FOREIGN PATENT DOCUMENTS

CN      106211332 A       12/2016
CN      113287351 A  *    8/2021  ............ H04W 24/08
(Continued)

OTHER PUBLICATIONS

Ericsson, Support for transmission in preconfigured UL resources in NB-IoT, Aug. 20, 2018, 3GPP TSG-RAN WG1 Meeting #94, Gothenburg, Sweden, Agenda Item: 6.2.2.2, Tdoc: R1-1808044 (Year: 2018).*

(Continued)

*Primary Examiner* — Eric Nowlin
(74) *Attorney, Agent, or Firm* — Sterne, Kessler, Goldstein & Fox P.L.L.C.

(57) ABSTRACT

Embodiments of the present disclosure provide for configuration and use of preconfigured uplink resources.

20 Claims, 10 Drawing Sheets

(51) Int. Cl.
*H04W 72/23* (2023.01)
*H04W 72/51* (2023.01)
*H04W 76/27* (2018.01)

(58) Field of Classification Search
CPC ............... H04W 4/80; H04W 52/0216; H04W 52/0219; H04W 56/0045; H04W 72/1268; H04W 72/21; H04W 72/23; H04W 72/51; H04W 76/27; Y02D 30/70
See application file for complete search history.

(56) References Cited

U.S. PATENT DOCUMENTS

| | | | |
|---|---|---|---|
| 10,256,957 B2 * | 4/2019 | Park | H04L 5/0053 |
| 10,638,486 B2 | 4/2020 | Luo et al. | |
| 10,708,944 B2 * | 7/2020 | Arshad | H04L 5/0037 |
| 11,616,528 B2 * | 3/2023 | Rico Alvarino | H04L 5/0044 370/329 |
| 11,864,212 B2 * | 1/2024 | Sha | H04W 72/1273 |
| 2014/0133430 A1 * | 5/2014 | Yang | H04W 74/0833 370/329 |
| 2017/0019813 A1 * | 1/2017 | Kim | H04L 5/0048 |
| 2017/0164350 A1 | 6/2017 | Sun et al. | |
| 2017/0295546 A1 | 10/2017 | Young et al. | |
| 2018/0048444 A1 * | 2/2018 | Park | H04J 11/0079 |
| 2019/0069319 A1 * | 2/2019 | Arshad | H04W 72/23 |
| 2020/0228283 A1 * | 7/2020 | Cai | H04L 5/26 |
| 2020/0350949 A1 * | 11/2020 | Rico Alvarino | H04L 1/1854 |
| 2021/0014864 A1 * | 1/2021 | Phuyal | H04W 72/23 |
| 2021/0037530 A1 * | 2/2021 | Shih | H04W 72/21 |
| 2021/0112526 A1 * | 4/2021 | Dhanda | H04W 72/04 |
| 2021/0168746 A1 * | 6/2021 | Mi | H04B 17/318 |
| 2021/0298108 A1 * | 9/2021 | Wu | H04W 56/0045 |
| 2021/0321391 A1 * | 10/2021 | Phuyal | H04W 72/20 |
| 2021/0345344 A1 * | 11/2021 | Sha | H04W 24/08 |
| 2021/0410166 A1 * | 12/2021 | Shrestha | H04L 5/0055 |
| 2022/0007391 A1 * | 1/2022 | Höglund | H04W 72/21 |
| 2022/0085942 A1 * | 3/2022 | Kim | H04W 76/27 |
| 2022/0104306 A1 * | 3/2022 | Shrestha | H04W 76/27 |
| 2022/0167385 A1 * | 5/2022 | Takeda | H04W 72/23 |
| 2022/0217712 A1 * | 7/2022 | Xu | H04W 56/0045 |
| 2022/0224406 A1 * | 7/2022 | Xu | H04W 72/02 |
| 2022/0232600 A1 * | 7/2022 | Kim | H04L 1/08 |
| 2023/0050167 A1 * | 2/2023 | Yi | H04L 1/188 |
| 2023/0130518 A1 * | 4/2023 | Phuyal | H04W 72/21 370/329 |
| 2023/0362965 A1 * | 11/2023 | Phuyal | H04W 72/23 |

FOREIGN PATENT DOCUMENTS

| | | | | |
|---|---|---|---|---|
| EP | 4231732 A2 * | 8/2023 | ........... | H04L 5/0053 |
| KR | 20210030999 A * | 3/2021 | | |
| KR | 20210114984 A * | 9/2021 | | |
| WO | WO 2016153548 A1 | 9/2016 | | |
| WO | WO 2018028604 A1 | 2/2018 | | |
| WO | WO-2018128578 A1 * | 7/2018 | ............. | H04L 5/001 |
| WO | WO 2017133763 A1 | 8/2018 | | |
| WO | WO 2018175976 A1 | 9/2018 | | |
| WO | WO-2020032659 A1 * | 2/2020 | ........... | H04L 5/0053 |

OTHER PUBLICATIONS

Huawei et al., On support for transmission in preconfigured UL resources, Aug. 20, 2018, 3GPP TSG-RAN WG1 Meeting #94, Gothenburg, Sweden, Agenda Item: 6.2.2.2, Tdoc: R1-1808108 (Year: 2018).*
Sierra Wireless, Pre-configured UL Resources Design Considerations, Aug. 20, 2018, 3GPP TSG-RAN WG1 Meeting #94, Gothenburg, Sweden, Agenda Item: 6.2.2.2, Tdoc: R1-1808358 (Year: 2018).*
LG Electronics, Discussion on preconfigured UL resources in NB-IoT, Aug. 20, 2018, 3GPP TSG-RAN WG1 Meeting #94, Gothenburg, Sweden, Agenda Item: 6.2.2.2, Tdoc: R1-1808475 (Year: 2018).*
ZTE, Support for transmission in preconfigured UL resources for NBIoT, Aug. 20, 2018, 3GPP TSG RAN WG1 Meeting #94, Gothenburg, Sweden, Agenda item: 6.2.2.2, Tdoc: R1-1808641 (Year: 2018).*
Samsung, Discussion on transmission in preconfigured UL resources for NB-IoT, Aug. 20, 2018, 3GPP TSG RAN WG1 Meeting #94, Gothenburg, Sweden, Agenda item: 6.2.2.2, Tdoc: R1-1808738 (Year: 2018).*
MediaTek Inc., Early Data Transmission on Preconfigured UL Resources in NB-IoT, Aug. 20, 2018, 3GPP TSG RAN WG1 Meeting #94, Gothenburg, Sweden, Agenda item: 6.2.2.2, Tdoc: R1-1808960 (Year: 2018).*
Qualcomm Incorporated, Support for transmission in preconfigured UL resources, Aug. 20, 2018, 3GPP TSG RAN WG1 Meeting #94, Gothenburg, Sweden, Agenda item: 6.2.2.2, Tdoc: R1-1809032 (Year: 2018).*
NTT Docomo, Inc., UL transmission scheme in preconfigured resources, Aug. 20, 2018, 3GPP TSG RAN WG1 Meeting #94, Gothenburg, Sweden, Agenda item: 6.2.2.2, Tdoc: R1-1809132 (Year: 2018).*
Huawei et al., Feature lead summary of Support for transmission in preconfigured UL resources, Aug. 20, 2018, 3GPP TSG RAN WG1 Meeting #94, Gothenburg, Sweden, Agenda item: 6.2.2.2, Tdoc: R1-1809571 (Year: 2018).*
Qualcomm Incorporated, Support for transmission in preconfigured UL resources, 3GPP TSG RAN WG1 Meeting #94, Gothenburg, Sweden, Aug. 20-Aug. 24, 2018, Agenda Item: 6.2.1.2, Tdoc: R1-1809023 (Year: 2018).*
International Search Report directed to related International Patent Application PCT/US2019/052908, mailed Jan. 8, 2020.
Intel Corporation, 'UL transmission in preconfigured resources for NB-Iot', R1-1808661, 3GPP TSG RAN WG1 Meeting #94, Gothenburg, Sweden, Aug. 11, 2018 See sections 2-4.
Nokia et al., 'Preconfigured Grant for Uplink transmission', R1-1808440, 3GPP TSG RAN WG1 Meeting #94, Gothenburg, Sweden, Aug. 10, 2018 See sections 2-3.
Nokia et al., 'Transmission in preconfigured UL resources', R1-1808431, 3GPP TSG RAN WG1 Meeting #94, Gothenburg, Sweden, Aug. 10, 2018 See p. 2.
Ericsson, 'Support for transmission in preconfigured UL resources in LTE-MTC', R1-1808035, 3GPP TSG RAN WG1 Meeting #94, Gothenburg, Sweden, Aug. 10, 2018 See section 2.3.1.

* cited by examiner

PRECONFIGURED SHARED RESOURCES FOR UPLINK TRANSMISSION

CROSS REFERENCE TO RELATED APPLICATION

This application is a national phase entry of PCT/US19/52908, filed on Sep. 25, 2019, which claims priority to U.S. Provisional Patent Application No. 62/739,057, filed Sep. 28, 2018, entitled "Preconfigured Shared Resources for Uplink Transmission, both of which are hereby incorporated by reference in their entireties.

FIELD

Embodiments of the present invention relate generally to the technical field of wireless communications.

BACKGROUND

Third Generation Partnership Project (3GPP) has developed various technologies for Internet of things (IoT) deployments. These standards include enhanced machine type communication (eMTC) and narrowband IoT (NB-IOT). The eMTC technology is an enhancement to Long Term Evolution (LTE) design for machine type communications (MTC) and includes enhancements such as: support for positioning, multicast, and voice over LTE; mobility for inter-frequency measurements; and higher data rates. NB-IoT is a technology that is even lower cost than eMTC with enhancements related to extended coverage, longer battery life, and support for massive number of devices (e.g., at least 50,000 per cell).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

NB-IoT and eMTC devices may need to support transmissions in preconfigured resources in radio resource control (RRC) IDLE and RRC CONNECTED modes. RRC CONNECTED/IDLE modes may also be referred to as RRC CONNECTED/IDLE states. These transmissions may be based on single carrier-frequency division multiple access (SC-FDMA) waveform for UEs with a valid timing advance. Both shared resources and dedicated resources may be considered.

Embodiments disclosed herein describe preconfigured resources to support uplink transmission for both MTC (including eMTC) and NB-IoT. Some embodiments describe utilizing shared resources in an IDLE mode for the uplink transmissions. However, similar concepts may be used in embodiments using shared resources in a CONNECTED mode or dedicated resources in CONNECTED or IDLE modes.

Figure 1:
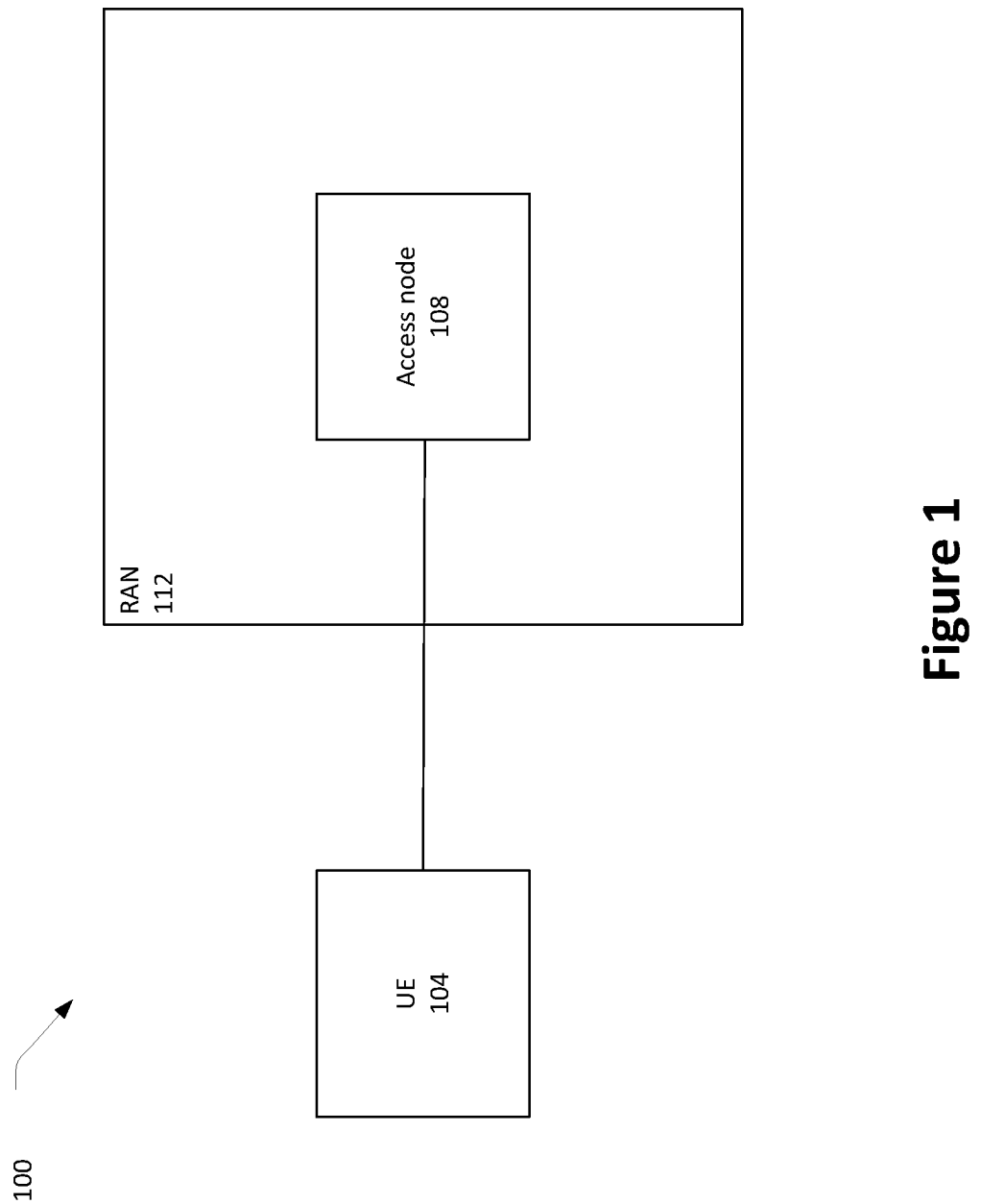
FIG. 1 illustrates a network in accordance with some embodiments.

FIG. 1 illustrates an access network 100 in accordance with some embodiments. In general, the components shown in the access network 100 may be similar to, and substantially interchangeable with, like-named components in other figures described herein. The network 100 may include a UE 104 to communicate with an access node 108 of a radio access network (RAN) 112 using one or more radio access technologies. The UE 104 may be an eMTC device or an NB-IoT device. The RAN 112 may be an evolved universal terrestrial access network (E-UTRAN), a fifth generation (5G) RAN, or some other type of wireless access network. The access node 108 can be referred to as a base station (BS), an evolved node B (eNB), a 5G node B (gNB), a next generation evolved node B (ng-eNB), etc.

The UE 104 may be a low-cost, low-power consumption, or enhanced coverage device. The UE 104 may identify preconfigured resources that it subsequently uses for uplink transmissions to the access node 108.

In some embodiments, the access node 108 may provide the UE 104 with configuration information with respect to the preconfigured resource pools for UL transmission. A configuration of a resource pool may assume one or several modulation and coding scheme (MCS) or transport block size (TBS) values used for UL transmission in the resource pool and one or a number of repetitions of the UL transmission. The configuration of the preconfigured resource pools may allow UEs, for example, UE 104, to autonomously select and share resources for UL transmissions.

As will be described in further detail, some embodiments include: signaling for initial configuration and reconfiguration or release of the resource pools; and collision handling in cases when UEs use the same resource pool.

In the disclosure, unless it is stated explicitly, all the embodiments and examples may be applied to both LTE MTC and NB-IoT radio access systems. Furthermore, teachings with respect to MTC may also be applicable to eMTC.

Figure 2:
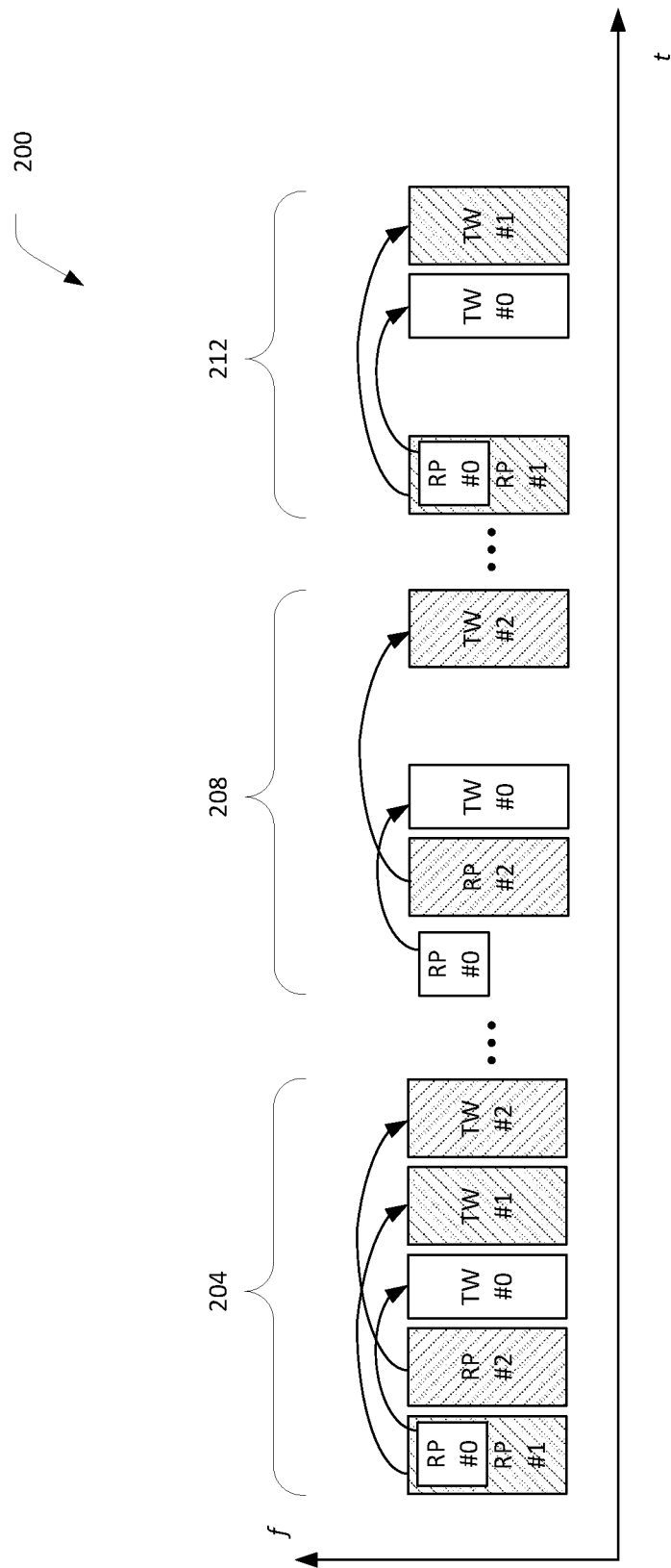
FIG. 2 illustrates a periodical time-frequency allocation of resource pools and associated time windows in accordance with some embodiments.

FIG. 2 illustrates a periodical time-frequency allocation of resource pools (RPs) and associated time windows (TWs) in accordance with some embodiments.

A resource pool, which may also be referred to as a preconfigured uplink resource (PUR) configuration, may be a logical aggregation of physical resources for UL transmission. In some embodiments, physical resources may be physical resource block (PRB) pairs each occupying 12 frequency subcarriers and 2 time slots or, in other words, 1 subframe using E-UTRAN terminology. However, in some embodiments, resource pools may include or consist of resource units (RUs) for sub-PRB UL transmission, thus, occupying a few PRB subcarriers in the frequency domain. The sub-PRB UL transmissions may be used in, for example, NB-IoT scenarios.

FIG. 2 illustrates three resource pools, RPs #0, #1, and #2, respectively associated with three time windows, TWs #0, #1, and #2. As can be seen with respect to RP #0 and RP #1, different resource pools may overlap with one other.

Within a time window, the UE 104 may monitor for downlink control information (DCI). In some embodiments, the DCI may either confirm a successful UL transmission happened in the corresponding resource pool (via the mechanism of indication of explicit UL hybrid automatic repeat request-acknowledgement (HARQ-ACK)) or request that the UL be re-transmitted by, for example, using a HARQ mechanism (via an UL grant).

In other embodiments, the DCI may include scheduling information to schedule a downlink (DL) shared channel that is to carry a data transmission that may either confirm the successful UL transmission in the corresponding resource pool or request the UL retransmission by use of the HARQ mechanism.

Resource pools may be configured with different periodicities. For example, FIG. 2 illustrates three periods, a first period 204, a second period 208, and a third period 212. RP #0 and associated TW #0 may be allocated in each of these periods; RP #1 and associated TW #1 may be allocated in only the first period 204 and the third period 212; and RP #2 and associated TW #2 may be allocated in only the first period 204 and the second period 208.

In some embodiments, a physical downlink control channel (PDCCH) search space may be configured for monitoring for DCI. The PDCCH may be referred to as an MTC PDCCH (MPDCCH) for MTC embodiments or an NB-IoT PDCCH (NPDCCH) for NB-IoT embodiments. The configuration of the (M/N)PDCCH search space for DCI monitoring may reuse existing (M/N)PDCCH search space definitions. For example, when in IDLE mode, the configuration for (M/N)PDCCH Type2-common search space (CSS) for random access can be used. When in CONNECTED mode, the configuration for (M/N)PDCCH UE-specific search space (UESS) can be used. Further, for eMTC, when in CONNECTED mode, the UE 104 can be specified to monitor for DCI formats 6-0A and 6-0B depending on a current coverage extension (CE) mode configured (again, when in connected mode) and depending on the latest configured CE mode before transitioning to IDLE mode (when the UE 104 transmits on preconfigured UL resources from IDLE mode). For NB-IoT systems, the UE 104 can monitor for DCI format N0 for any rescheduling UL grant. For NB-IoT systems, an explicit indication of positive acknowledgment to the PUSCH transmission (without any further scheduling of new or retransmission of PUSCH transport block) may also be realized by setting all fields in the DCI format N0 to zero except for the following: flag for N0/N1 differentiation; DCI subframe repetition number; and modulation and coding scheme: ACK can be indicated by setting MCS field to "1111," for example.

In various embodiments, one or multiple resource pools can be set in the system. In general, the UE 104 may autonomously select the resource pool for UL transmission. In cases when multiple UEs select the same resource pool there is potential for a collision to occur. In order to reduce the collision probability, some embodiments utilize resource patterns within the different resource pools.

Figure 3:
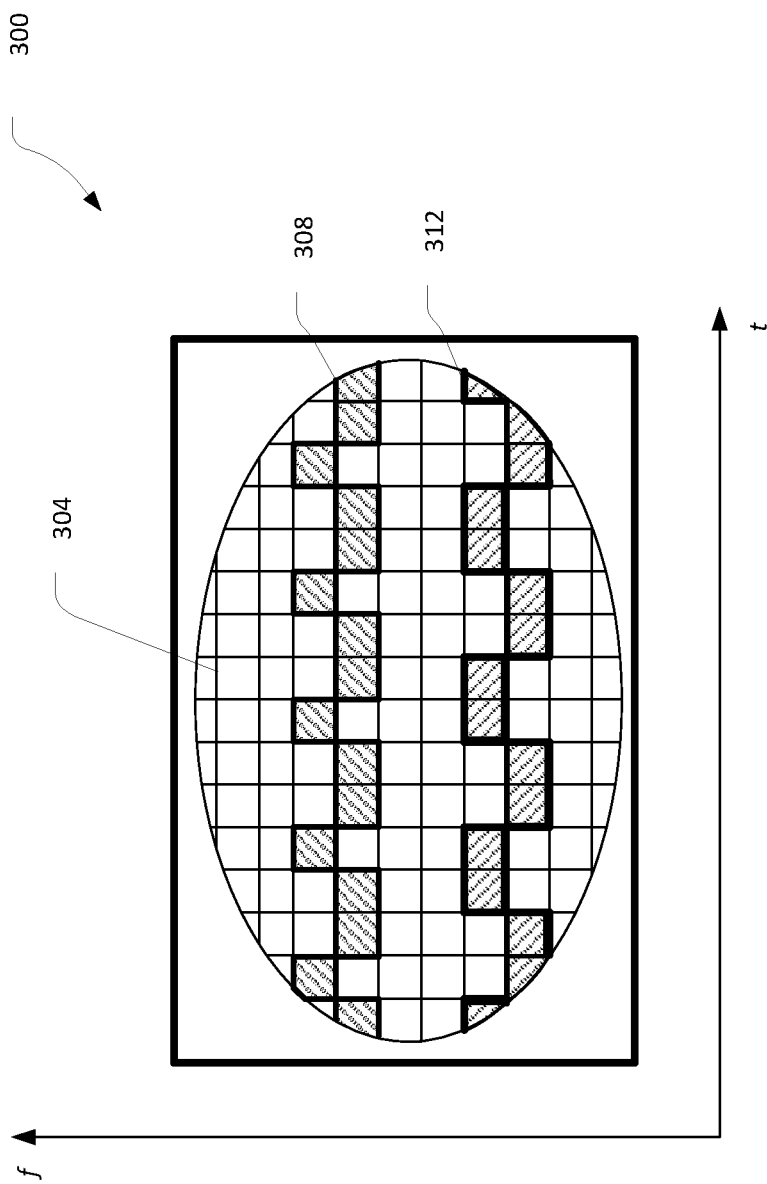
FIG. 3 illustrates a resource pool in accordance with some embodiments.

FIG. 3 illustrates a resource pool 300 in accordance with some embodiments. The resource pool 300 may include a number of resource units 304 that may be allocated. The resource pool 300 may include a first resource pattern 308, which includes a first set of the resource units 304, and a second resource pattern 312, which includes a second set of the resource units 304. In some embodiments, the UE 104 may be configured with the resource patterns of the resource pool 300 and may autonomously select one of the resource patterns for an uplink transmission. The resource patterns can be viewed as a sequence of time or time-frequency resources corresponding to a single physical uplink shared channel (PUSCH) transmission using a certain number (for example, one or more) of repetitions.

In some embodiments, the UE-autonomous resource selection can be defined to follow a uniformly random selection procedure over a set of resource patterns that constitutes the resource pool. If selected, it may define (possibly together with other parameters) what particular physical resources from the pool can be used for UL transmission. In some embodiments, the UE 104 may select a particular resource paten) from the provided set of patterns based on one of UE's unique identifiers, UE_ID, for example, IMSI. Other candidates to determine the pattern choice may include, e.g., estimated UL coverage level or service type (for example, type of data sent such as, but not limited to, voice over IP traffic, sensor traffic, etc.). The access node 108 receiving UL signal in a resource pool may know all the parameters of that resource pool including the set of available resource pattern and may try to blindly detect an UL signal in every resource pattern. In some embodiments, the UL signal used by the access node 108 to detect the transmission in the preconfigured resources may be an UL demodulation reference signal (DMRS). In other embodiments, a new kind of UL signal selected by the UE 104 can be used for that purposes, for example, one from a set of preamble/announcement signals specially designed for UL transmission in preconfigured resources. In other embodiments, the UE_ID may also be transmitted in the preconfigured resources as part of UL payload for collision resolution.

Figure 4:
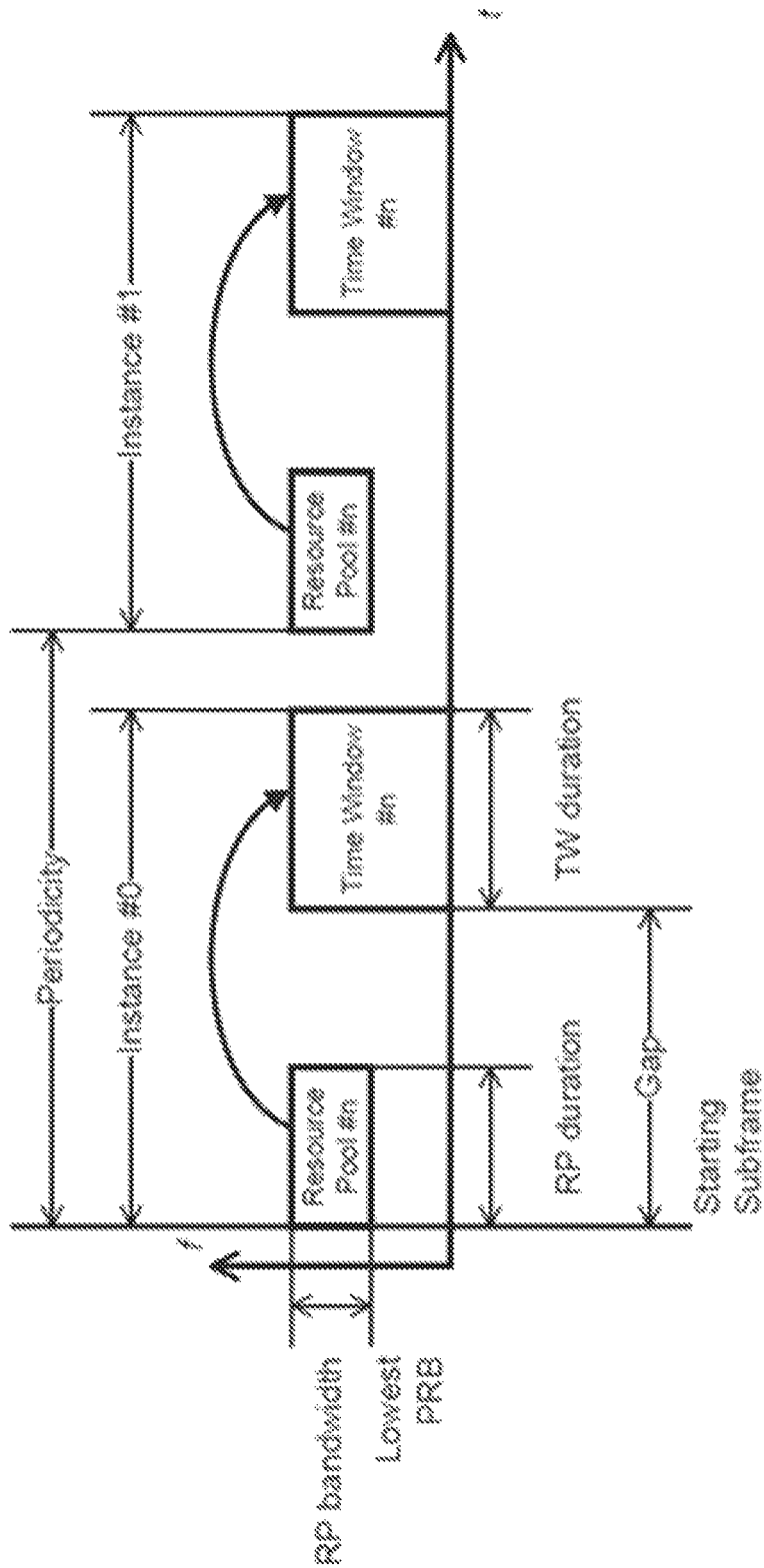
FIG. 4 schematically illustrates configuration parameters of a resource pool (RP #n) in accordance with some embodiments.

FIG. 4 schematically illustrates configuration parameters of a resource pool (RP #n) in accordance with some embodiments. The parameters may include one or more of the following: a starting subframe of the resource pool; a resource pool duration, which defines a maximum number of repetitions during a particular UL transmission in the resource pool; a periodicity of the resource pool allocation (for example, availability for UL transmission); a lowest PRB (or other allocation unit) of the resource pool, which may be used to determine a position of the resource pool in the frequency domain; a resource pool bandwidth in cases when it may differ from 1 PRB; a gap in a time domain between the resource pool and an associated time window in which the UE is to monitor for DCI transmission; and a time window duration.

As discussed above, the access node 108 may send information to communicate these configuration parameters to the UE 104 using one or more configuration messages.

While the time gap illustrated in FIG. 4 considers the time between the first subframe in a resource pool to the first subframe of the time window for (M/N)PDCCH monitoring, other timing relationships may be defined. For example, the gap may be defined between an end of a set of repetitions for an (N)PUSCH transmission within a resource pool and a first subframe of a time window for (M/N)PDCCH monitoring.

The time window duration may be defined similar to a contention resolution window defined as part of a random access procedure. In another example, the time window durations may be separately configured for when the UE 104 is in IDLE mode or in CONNECTED mode. The concept of the time window duration may be applied on top of the starting subframe and periodicity indicated by the configuration of the corresponding (M/N)PDCCH search spaces as described above.

Each resource pool may be associated with at least one MCS or TBS and at least one value of the number of transmission repetitions that may be used during the UL transmission in that pool. In some embodiments, a mixed approach may be taken where the MCS/TBS is fixed for a particular resource pool but a number of candidate values of the number of repetitions is configured. This can be also configured by setting the maximum number of repetitions and a number of candidates for a starting subframe. In other embodiments, the number of repetitions may be fixed and a number of candidate MCS/TBS values may be configured for the UE 104. If the MCS/TBS and/or number of repetitions is not fixed, then the UE can choose one of the candidate values based on its estimate of the UL range. It may be up to receiving access node 108 to detect which MCS/TBS and/or number of repetitions are used by the UE 104.

The size of the resource unit (RU), for example, RUs 304, may also be a part of the resource pool configuration. This may be especially useful in embodiments in which the resource pool may be intended for sub-PRB UL transmission (for example, NB-IoT systems).

The resource pool configurations may be provided to the UE 104 using high layer radio resource control (RRC) signaling. In some embodiments, UE-specific dedicated RRC signaling can be used for this purpose. In this case, the UE 104 may initially receive the resource pool configuration being in the RRC CONNECTED mode. After that, the UE 104 in CONNECTED mode can use the received resource pool configuration for UL transmission in the corresponding resources.

In E-UTRA systems, before turning into the RRC CONNECTED mode the UE 104 may perform a Random Access (RA) procedure and may get a valid timing advance (TA) from the access node 108. Herein, it may be assumed that the valid TA, obtained during the RA procedure, as well as the resource pool configuration, obtained in the RRC CONNECTED mode, can be later used by the UE 104 for UL transmission in the preconfigured resources even if the UE 104 transitions into the RRC IDLE state.

In some embodiments, the cell-common transmission of system information blocks (SIBs) may be used to deliver the resource pool configurations to the UEs. The reception of SIBs may be enabled for UEs in connected or IDLE mode. Because of that, the SIB transmission can be also used for reconfiguration of resource pool parameters or release of resource pools. The latter can be used, for example, for aperiodic UL transmission in the preconfigured resources when, after a certain number instances (which may be part of the configuration information), the resource pool and corresponding time window can be released and their resources can be reused for other UL transmission types. Of course, the UE-specific dedicated RRC signaling can be exploited for resource pool reconfiguration/release. But in those embodiments, the UEs may need to be in CONNECTED mode to be reached.

Dedicated resources, for example, those resources used for contention-free access, may be a special case of shared resources depending on the resource pool configuration provided by the access node 108. In other words, by setting the proper resource pool parameters, the access node 108 may allocate the resources exclusively for a particular UE. As one example, a dedicated allocation can be realized by configuring the UE 104 with a preconfigured resource pool configuration that has a single transmission resource.

Figure 5:
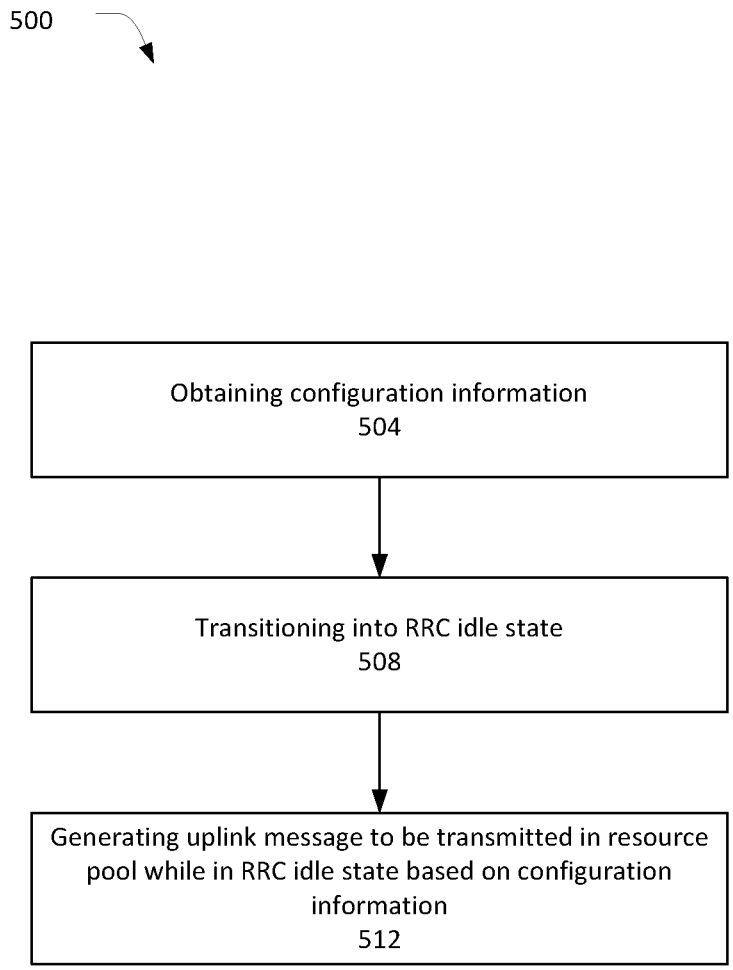
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be performed, in part or in whole, by the UE 104 or components thereof. For example, in some embodiments the operation flow/algorithmic structure 500 may be performed by baseband circuitry implemented in the UE 104.

The operation flow/algorithmic structure 500 may include, at 504, obtaining configuration information. The configuration information may be obtained in one or more messages received from the access node 108. In various embodiments, the messages may be received while the UE 104 is in an RRC connected. For example, in some embodiments, the configuration information may include a timing advance that the UE 104 receives during an RA procedure and may further include resource pool configuration information that the UE 104 receives while in an RRC CONNECTED mode.

The operation flow/algorithmic structure 500 may further include, at 508, transitioning into an RRC IDLE state. While in the RRC IDLE state the UE 104 may generally deactivate its radio, but still have an IP address assigned and tracked by the network. While in IDLE, the UE 104 may perform a number of procedures including public land mobile network (PLMN) selection, cell (re)selection, cell reservations and access restriction, tracking area registration, broadcast message reception (including acquisition of management information block (MIB) and SIB messages); and paging.

The operation flow/algorithmic structure 500 may further include, at 512, generating an uplink message to be transmitted in a resource pool. The message may be transmitted while the UE 104 is still in the IDLE state. The UE 104 may use the resource pool that is determined from the configuration information for the UL transmission. In some embodiments, the UE 104 may select a resource pattern from a plurality of resource patterns in the resource pool, as described above, and encode the uplink message on the resource units of the selected resource pattern.

The UE 104 may also monitor a time window for a DCI transmission. The DCI transmission may carry HARQ information or schedule a downlink transmission that carries the HARQ information as described above.

Figure 6:
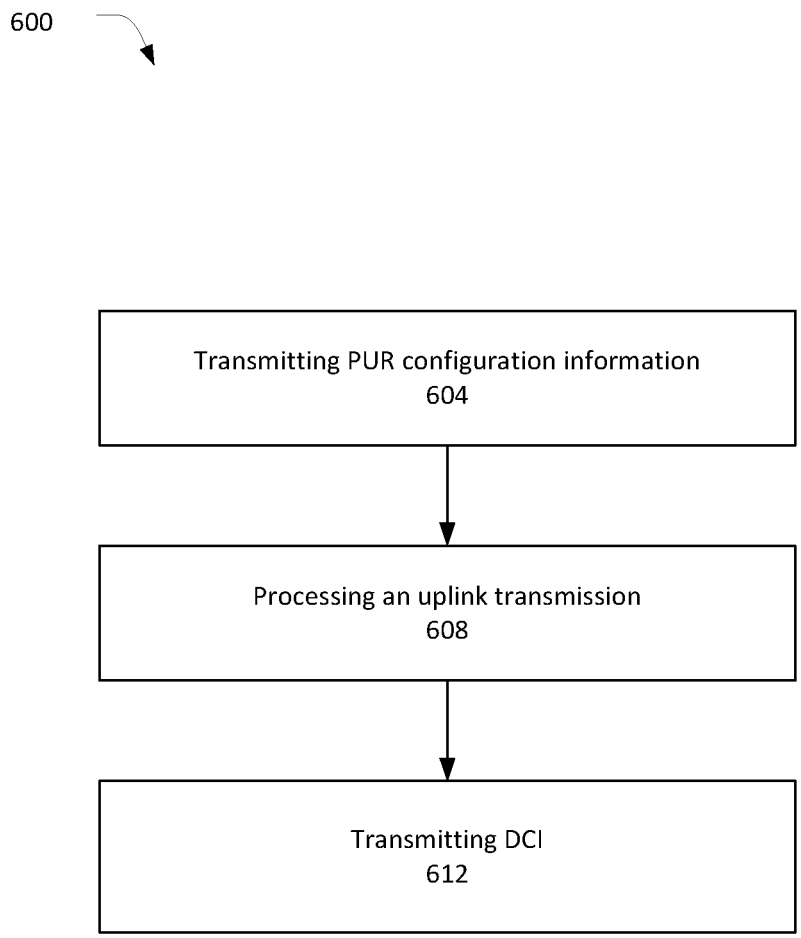
FIG. 6 illustrates an operation flow/algorithmic structure in accordance with some embodiments.

FIG. 6 illustrates an operation flow/algorithmic structure 600 in accordance with some embodiments. The operation flow/algorithmic structure 600 may be performed, in part or in whole, by the access node 108 or components thereof. For example, in some embodiments the operation flow/algorithmic structure 600 may be performed by the baseband circuitry implemented in the access node 108.

The operation flow/algorithmic structure 600 may include, at 604, transmitting preconfigured uplink resource (PUR) configuration information to configure a resource pool and time window. In some embodiments, the PUR configuration information may be transmitted to the UE 104 while the UE is in an RRC CONNECTED mode.

In some embodiments, the PUR configuration information may be broadcast to a plurality of UEs in a cell. For example, the PUR configuration information may be transmitted in one or more system/master information blocks. In other embodiments, the PUR configuration information may be specific to the UE 104 and sent, for example, in by a UE-specific radio resource control signal.

The operation flow/algorithmic structure 600 may further include, at 608, processing an uplink transmission. The uplink transmission may be transmitted by the UE 1054 on resources of the configured resource pool.

The operation flow/algorithmic structure 600 may further include, at 612, transmitting DCI to provide an indication of successful or unsuccessful receipt of the uplink transmission. The DCI may provide an indication of whether the uplink transmission was successfully received. The indication may be, for example, HARQ ACK/NACK information.

In some embodiments, the HARQ ACK/NACK information may be transmitted in the transmit window configured by the PUR configuration information. In other embodiments, the access node may transmit scheduling information in the transmit window, the scheduling information to schedule downlink resources, for example, a PDSCH or a PDCCH transmission, in which the HARQ ACK/NACK information is to be transmitted.

Figure 7:
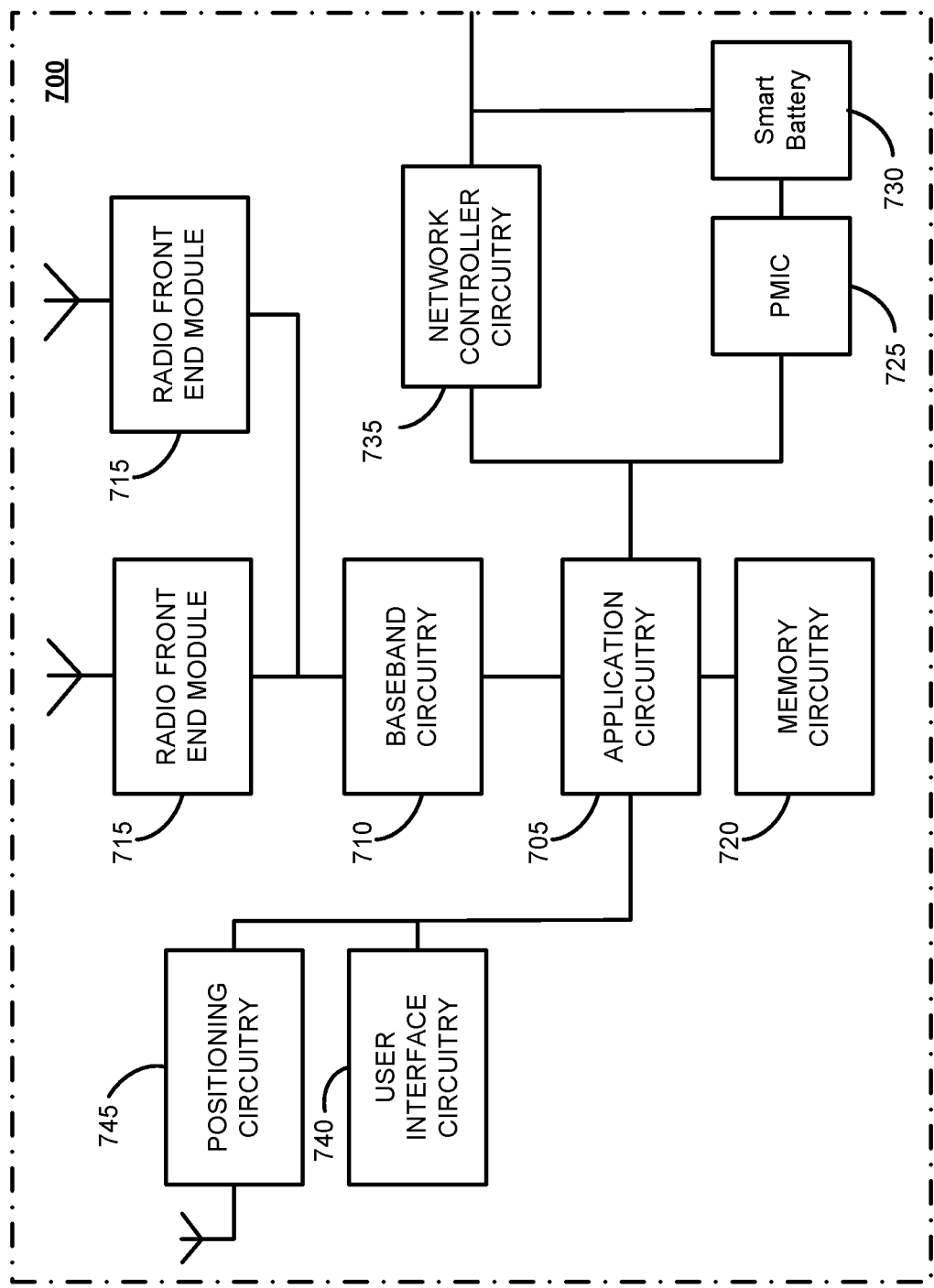
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node such as the RAN nodes XQ11 and/or AP XQ06 shown and described previously, application server(s) XQ30, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or SGC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 9.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 9111 of FIG. 9 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes XQ11, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
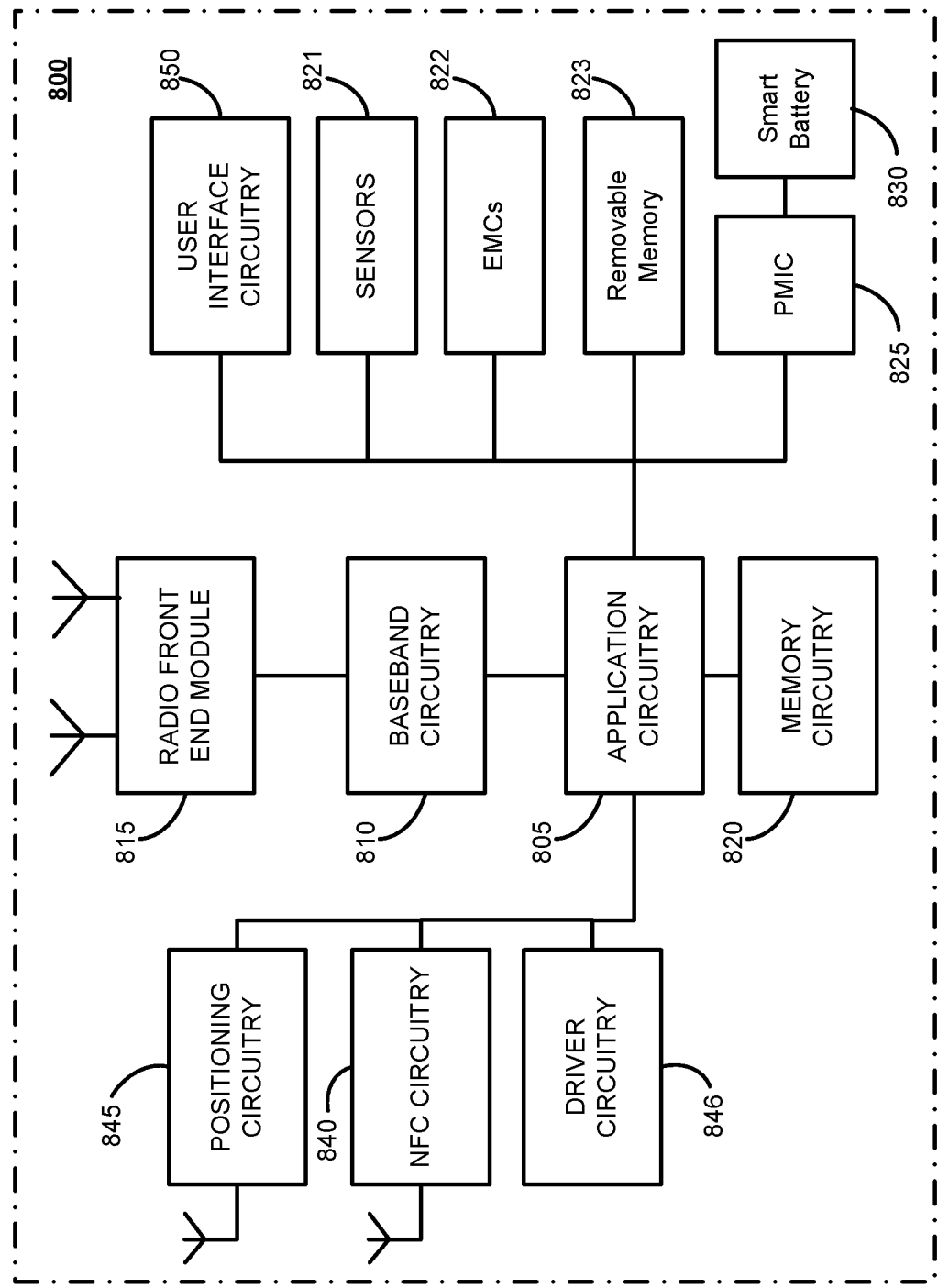
FIG. 8 depicts example components of a computer platform or device in accordance with various embodiments.

FIG. 8 illustrates an example of a platform 800 (or "device 800") in accordance with various embodiments. In embodiments, the computer platform 800 may be suitable for use as UEs XQ01, XQ02, XR101, application servers XQ30, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 805 may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 920 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry 710 and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE XQ01, XQ02, XR101.

In some embodiments, the PMIC 825 may control, or otherwise be part of, various power saving mechanisms of the platform 800. For example, if the platform 800 is in an RRC Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block XS30 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 9:
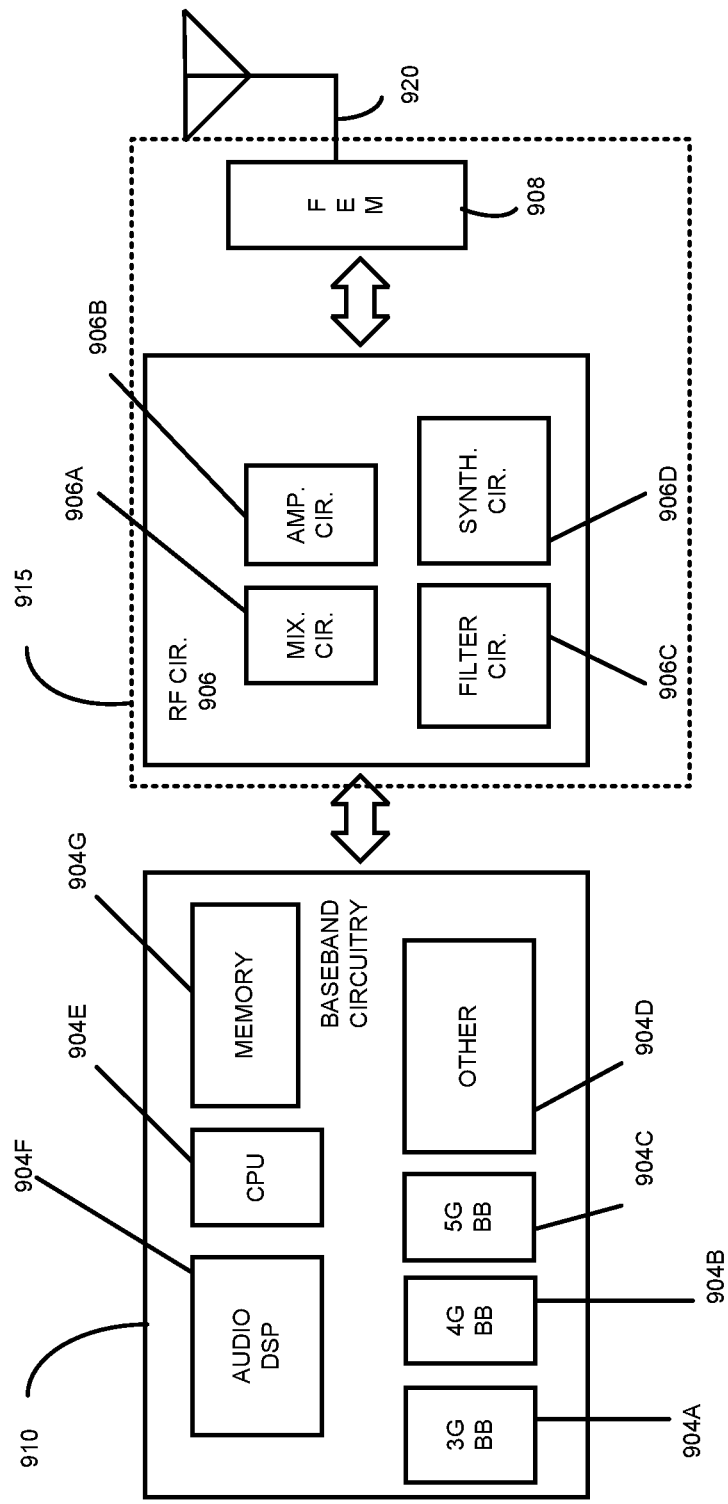
FIG. 9 depicts example components of baseband circuitry and radio frequency end modules in accordance with various embodiments.

FIG. 9 illustrates example components of baseband circuitry 910 and radio front end modules (RFEM) 915 in accordance with various embodiments. The baseband circuitry 910 corresponds to the baseband circuitry 710 and 810 of FIGS. 7 and 8, respectively. The RFEM 915 corresponds to the RFEM 715 and 815 of FIGS. 7 and 8, respectively. As shown, the RFEMs 915 may include Radio Frequency (RF) circuitry 906, front-end module (FEM) circuitry 908, antenna array 920 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 705/805 (see FIGS. 7 and 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., si9h generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 705/805 of FIGS. 7-9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 705/805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 705/805 depending on the desired output frequency. In some embodiments, a divider control input (e.g., N) may be determined from a look-up table based on a channel indicated by the application circuitry 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 920, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 920. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 920.

The antenna array 920 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 920 including one or more antenna elements (not shown). The antenna elements may be omnidirectional, direction, or a combination thereof. The antenna elements may be formed in a multitude of arranges as are known and/or discussed herein. The antenna array 920 may comprise microstrip antennas or printed antennas that are fabricated on the surface of one or more printed circuit boards. The antenna array 920 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 705/805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 705/805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
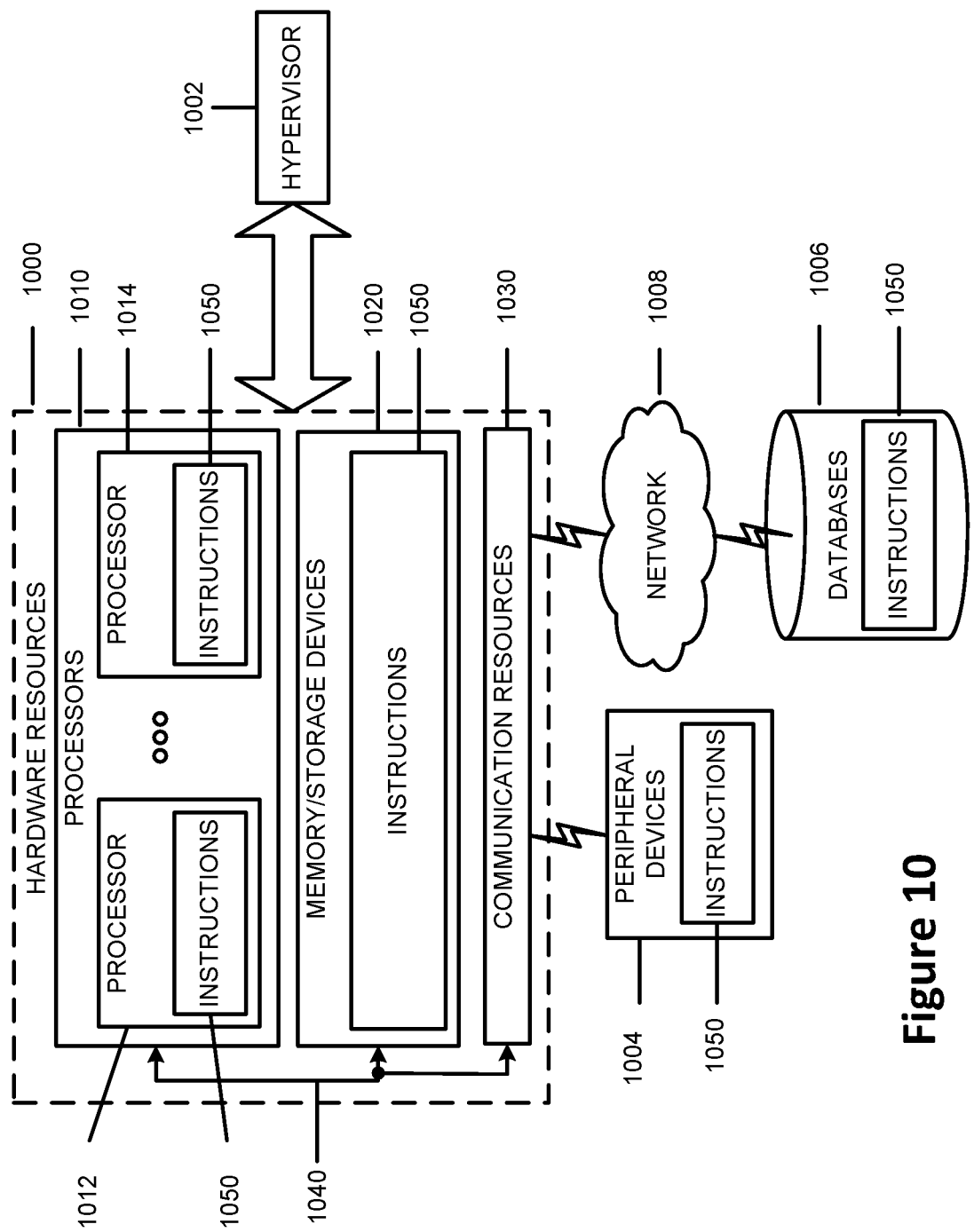
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 includes a method of operating a user equipment (UE) comprising: obtaining, while in a radio resource control (RRC) CONNECTED mode, a timing advance and preconfigured uplink resource (PUR) configuration information, the PUR configuration information to configure a resource pool and associated time window; transitioning from the RRC CONNECTED mode to an RRC IDLE state; and generating an uplink message to be transmitted in the resource pool while the UE is in the RRC IDLE state.

Example 2 includes the method of example 1 or some other example herein, wherein the resource pool includes one or more physical resource block (PRB) pairs.

Example 3 includes the method of example 1 or some other example herein, wherein the resource pool includes one or more resource units for a sub-physical resource block (PRB) uplink transmission.

Example 4 includes the method of example 1 or some other example herein, further comprising: monitoring the time window for downlink control information (DCI) related to the uplink message.

Example 5 includes the method of example 1 or some other example herein, wherein the DCI confirms successful receipt of the uplink message or requests a retransmission of the uplink message by providing an uplink grant for the retransmission.

Example 6 includes the method of example 5 or some other example herein, wherein the uplink message is a narrowband Internet of things (NB-IoT) message and the DCI is to confirm successful receipt of the uplink message.

Example 7 includes the method of example 4 some other example herein, wherein the DCI include scheduling information of a downlink shared channel which carriers requests for a retransmission of the uplink message Example 8 includes the method of example 4 some other example herein, further comprising: determining a configuration of a machine-type/narrowband physical downlink control channel (MPDCCH/NPDCCH) search space; and monitoring the time window based on the configuration.

Example 9 includes the method of any one of examples 1-8, wherein the configuration is a UE-specific search space.

Example 10 includes a method of operating a UE comprising: storing preconfigured uplink resource (PUR) configuration information, the PUR configuration information to configure a resource pool and associated time window; generating, while in a radio resource control (RRC) IDLE state, an uplink transmission; and transmitting the uplink transmission in the resource pool.

Example 11 includes a method of example 10 or some other example herein, wherein the PUR configuration information is to configure a plurality of resource pools and the method further comprises selecting the resource pool from the plurality of resource pools.

Example 12 includes a method of example 10 or some other example herein, wherein the PUR configuration information is to configure a plurality of resource patterns within the resource pool and the method further comprises selecting a resource pattern of the plurality of resource patterns; and transmit the uplink transmission in resources of the resource pattern.

Example 13 includes the method of example 12 or some other example herein wherein selecting comprises selecting the resource pattern based on an identifier of the UE, an estimated uplink coverage level, or a service type associated with the uplink transmission.

Example 14 includes a method of example 10 or some other example herein, wherein the uplink transmission includes an identifier of the UE.

Example 15 includes the method of example 10 or some other example herein, wherein the PUR configuration information includes an indication of: a starting subframe of the resource pool; a resource pool duration that defined a maximum number of repetitions during a particular uplink transmission in the resource pool; a periodicity of an allocation of the resource pool; a lowest physical resource block (PRB) of the resource pool; a resource pool bandwidth; or a gap in a time domain between the resource pool and associated time window in which the UE is to monitor the downlink control information transmissions associated with the uplink transmission. Example 16 includes the method of any one of examples 10-15, further comprising processing a UE-specific RRC signal to obtain the PUR configuration information and storing the PUR configuration information in memory.

Example 17 includes a method of example 16 or some other example herein, wherein the UE-specific RRC signal is received while the UE is in an RRC CONNECTED mode.

Example 18 includes a method of operating an access note comprising: transmitting, to a user equipment, preconfigured uplink resource (PUR) configuration information to configure a resource pool and time window; processing an uplink transmission received from the UE in the resource pool; and transmitting, to the UE, downlink control information (DCI) in the transmit window to provide an indication of successful or unsuccessful receipt of the uplink transmission. Example 19 includes a method of example 18 or some other example herein, wherein to transmit the PUR configuration information, the access node is to generate and send a UE-specific radio resource control signal to the UE.

Example 20 includes the method of example 18 or some other example herein, wherein the DCI is to provide an indication of a successful receipt of the uplink transmission.

Example 21 includes the method of any one of examples 18-20, wherein the DCI in the transmit window includes scheduling information to schedule a downlink transmission to carry the indication of successful or unsuccessful receipt of the uplink transmission.

Example 22 includes a method of example 18 or some other example herein, wherein the DCI is to indicate an unsuccessful receipt of the uplink transmission by providing an uplink grant scheduling physical uplink shared channel (PSUCH) for a hybrid automatic repeat request (HARQ) retransmission of the uplink transmission.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a signal in a wireless network as shown and described herein. Example 30 may include a method of communicating in a wireless network as shown and described herein.

Example 31 may include a system for providing wireless communication as shown and described herein.

Example 32 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media having instructions that, when executed by one or more processors, cause a user equipment (UE) to:
obtain, prior to a radio resource control (RRC) CONNECTED mode, a timing advance and preconfigured uplink resource (PUR) configuration information, the PUR configuration information to configure a resource pool and a time window associated with the resource pool, wherein the resource pool is one of a plurality of resource pools configured with different periodicities;
transition to the RRC CONNECTED mode;
transition from the RRC CONNECTED mode to an RRC IDLE state; and
generate an uplink message to be transmitted in the resource pool while the UE is in the RRC IDLE state.

2. The one or more non-transitory computer-readable media of claim 1, wherein the resource pool includes one or more physical resource block (PRB) pairs.

3. The one or more non-transitory computer-readable media of claim 1, wherein the resource pool includes one or more resource units for a sub-physical resource block (sub-PRB) uplink transmission.

4. The one or more non-transitory computer-readable media of claim 1, wherein the instructions, when executed, further cause the UE to:
monitor the time window for downlink control information (DCI) related to the uplink message.

5. The one or more non-transitory computer-readable media of claim 4, wherein the DCI confirms successful receipt of the uplink message or requests a retransmission of the uplink message by providing an uplink grant for the retransmission.

6. The one or more non-transitory computer-readable media of claim 5, wherein the uplink message is a narrowband Internet of things (NB-IoT) message and the DCI is to confirm successful receipt of the uplink message.

7. The one or more non-transitory computer-readable media of claim 4, wherein the DCI includes scheduling information of a downlink shared channel which carries requests for a retransmission of the uplink message.

8. The one or more non-transitory computer-readable media of claim 4, wherein the instructions, when executed, further cause the UE to:
determine a configuration of a machine-type/narrowband physical downlink control channel (MPDCCH/NPDCCH) search space; and
monitor the time window based on the configuration.

9. A user equipment (UE), comprising:
memory to store preconfigured uplink resource (PUR) configuration information, the PUR configuration information to configure a resource pool and a time window associated with the resource pool, wherein the resource pool is one of a plurality of resource pools configured with different periodicities; and
processing circuitry, coupled with the memory, configured to:
obtain, prior to a radio resource control (RRC) CONNECTED mode, the PUR configuration information;
transition the UE to the RRC CONNECTED mode;
transition the UE to an RRC IDLE state;
generate, while in the RRC IDLE state, an uplink transmission with the PUR configuration information; and
transmit the uplink transmission in the resource pool.

10. The UE of claim 9, wherein the PUR configuration information is to configure a plurality of resource pools and the processing circuitry is further configured to:
select the resource pool from the plurality of resource pools.

11. The UE of claim 9, wherein the PUR configuration information is to configure a plurality of resource patterns within the resource pool and the processing circuitry is further configured to:

select a resource pattern of the plurality of resource patterns; and
transmit the uplink transmission in resources of the resource pattern.

12. The UE of claim 11, wherein the processing circuitry is configured to select the resource pattern based on an identifier of the UE, an estimated uplink coverage level, or a service type associated with the uplink transmission.

13. The UE of claim 9, wherein the uplink transmission includes an identifier of the UE.

14. The UE of claim 9, wherein the PUR configuration information includes an indication of:
a starting subframe of the resource pool;
a resource pool duration that defined a maximum number of repetitions during a particular uplink transmission in the resource pool;
a lowest physical resource block (PRB) of the resource pool;
a resource pool bandwidth; or
a gap in a time domain between the resource pool and the time window in which the UE is to monitor the downlink control information transmissions associated with the uplink transmission.

15. The UE of claim 9, wherein the processing circuitry is configured to process a UE-specific RRC signal to obtain the PUR configuration information and store the PUR configuration information in the memory.

16. The UE of claim 15, wherein the UE-specific RRC signal is received while the UE is in an RRC CONNECTED mode.

17. One or more non-transitory computer-readable media having instructions that, when executed by one or more processors, cause an access node to:
transmit, prior to a radio resource control (RRC) CONNECTED mode and to a user equipment (UE), preconfigured uplink resource (PUR) configuration information to configure a resource pool and a time window associated with the resource pool, wherein the resource pool is one of a plurality of resource pools configured with different periodicities;
process an uplink transmission received from the UE in the resource pool; and
transmit, to the UE, downlink control information (DCI) in the transmit window to provide an indication of successful or unsuccessful receipt of the uplink transmission.

18. The one or more non-transitory computer-readable media of claim 17, wherein to transmit the PUR configuration information, the access node is configured to generate and send a UE-specific radio resource control signal to the UE.

19. The one or more non-transitory computer-readable media of claim 17, wherein the DCI is to provide an indication of a successful receipt of the uplink transmission.

20. The one or more non-transitory computer-readable media of claim 17, wherein the DCI is to indicate an unsuccessful receipt of the uplink transmission by providing an uplink grant scheduling a physical uplink shared channel (PUSCH) for a hybrid automatic repeat request (HARQ) retransmission of the uplink transmission.

* * * * *